Patented Nov. 15, 1949

2,488,251

UNITED STATES PATENT OFFICE 2,488,251

METHOD FOR RESURFACING MASONRY AND CONCRETE STRUCTURES

Bourdette R. Wood, Shaker Heights, Ohio, assignor to The Master Builders Company, Cleveland, Ohio, a corporation of Ohio No Drawing. Application April 16, 1945, Serial No. 588,735

8 Claims. (Cl. 117—2)

This invention relates to a method of repairing or resurfacing masonry or concrete structures, particularly floor surfaces.

Thin cement and asphalt coatings for worn warehouse and factory floor surfaces are often unsatisfactory because of their tendency to disintegrate and break away from the original floor surface when subjected to pressure and repeated impacts such as are exerted by wheels of heavily laden trucks. The inability of such coatings to stand up under such usage is believed to be due to the brittle character of the aggregate which usually consists of particles of sand or other silicious material. The breaking or crushing of the particles of aggregate cause gradual disintegration of the coating and weakening of the bond between the surface layer and the original floor surface.

The present invention has for its object to provide a method of producing a bituminous concrete surface of superior wearing qualities in which the aggregate is composed wholly of a malleable material such as metal particles which are not disintegrated by impacts.

The main advantages obtained by the present invention are a floor surface that is durable, water-proof, wear resistant and sound deadening, which has a high coefficient of friction and which is resilient and capable of resisting heavy impacts without fracture. In addition, the surface has a high electrical conductivity and will not spark when struck by a heavy metallic object.

One object of the invention is to provide a superior bond between the surfacing material and the floor or other surface to which it is applied.

It is also an object to provide a bonding coat for a concrete covering that is water-proof and that will prevent the concrete or other porous base from absorbing moisture from the coating while it is setting.

An additional object is to provide a method of applying the surfacing material by which the material may be firmly bonded to a concrete brick or tile floor without roughening or chipping the surface to which the material is applied.

It is also an object of this invention to provide a firm bond between the base structure and an applied concrete layer along the edges of each applied layer so that cracking and breaking away of edge portions of a patch or other applied layer of concrete is avoided.

In applying surface layers to masonry structures by the method of the present invention a base composition is employed which is adapted to be applied to the surface to be repaired in a thin coating to form a bond and that can be mixed with water and hydraulic cement to form a concrete mix that can be applied to the bonding coat to form a tough wear resistant surface layer.

The base composition consists of an aqueous emulsion of a suitable bituminous material such as asphalt that contains a small amount of clay serving as a protective colloid, mixed with a graded aggregate composed of metal particles of irregular shape in an amount in excess of the asphalt emulsion by weight, and preferably in an amount sufficient to make the composition a crumbly mass.

The metal employed is prepared from borings, filings and the like that are first heat treated to remove all traces of oil and then ground in a suitable mill. After grinding the metal particles are screened and graded to provide a suitable mixture of coarse, medium and fine particles. Various metals such as copper, aluminum, zinc, lead, etc., may be employed, but iron is preferred because it is relatively inexpensive and because it imparts superior properties to the composition.

The base composition above described is suitable for use as a bonding coat and may be mixed with a suitable amount of Portland or an aluminous cement or a mixture of such cement with another finely divided filler such as fly ash, finely ground silica or diatomaceous earth to provide a resilient, wear resistant floor surface of asphaltic cement concrete. The base composition provides a very effective bond between such a concrete surface coating material and a brick, tile or concrete surface covered with the coating material because of the adhesiveness of the asphalt and because of the strong adhesion between the final surface coating material and the irregular metal particles projecting from the bonding coat. The composition also forms a waterproof coating for the surface that is to be covered which prevents the leaching of moisture from wet concrete applied upon the bonding coat.

It has been found that a small amount of a dispersing agent for the cement and other finely divided mineral fillers in the base composition is advantageous because the dispersing agent reduces the amount of water required to impart the necessary plasticity to the mix when the base composition is combined with the finely divided material to form the surfacing composition. The reduction in the amount of water in the mix results in a denser, stronger and smoother coating. Various dispersing agents may be employed, such for example as naphthalene sulfonates or lignin sulfonates such as contained in or obtained from waste sulfite liquor residue. Waste sulfite liquor provides a valuable dispersing agent for this composition. The dried residue waste sulfite liquor is readily obtainable and convenient to use, but the active constituents of waste sulfite liquor may be used either wet or dry or they may be somewhat purified or chemically treated to obtain the lignin sulfonates in suitable form for use as a dispersing agent.

A preferred base composition mainly consists of an asphalt emulsion, such for example as those commercially available for road surfacing and containing about 50 to 70% or so of asphalt or bitumen in suitable form, mixed with from two to five times its weight of a graded aggregate composed of iron particles of irregular shape, together with a dispersing agent such as dried waste sulfite liquor residue.

If the metal particles are so graded as to provide a mixture of sizes such that the voids between coarser particles are substantially filled by the finer particles, less hydraulic cement and other finely divided fillers will be required in the surfacing composition. If the desired grading cannot conveniently be obtained the quality of the composition may be maintained by increasing the quantity of cement and other fines. Although the size of the particles may be increased for floor surfacing layers of considerable depth, it is usually preferred that the grading be within the following limits:

Particles retained on an 8 mesh screen not more than 30% or less than 10%; on a 14 mesh screen not more than 30%, not less than 7%; on a 28 mesh screen not more than 65%, not less than 40%. Particles passing through a 48 mesh screen not more than 10%. Particles passing through a 100 mesh screen not more than 5%.

The base composition is in the form of a crumbly mass which may be broken up and sprinkled upon a surface to be repaired but which is sticky enough to adhere firmly to the surface when it is spread in a thin layer over the surface by means of a broom or other stiff bristle brush. The composition forms an excellent bonding coat by reason of its adhesiveness and by reason of the rough surface formed by the small sharp metal particles in the composition to which a concrete surface layer will strongly adhere.

The composition of the present invention will provide an excellent bond for an ordinary plaster or mortar coating, but is particularly adapted for bonding a surface layer which is formed of a mixture of the composition of the present invention with Portland cement and water.

A mix suitable for resurfacing floors is made by mixing the base composition with the finely divided filler composed of hydraulic cement or a mixture of such cement with one or more finely divided fillers together with sufficient water to impart the desired plasticity to the mix. The proportion of the filler employed is usually about one part by volume of filler to one part by volume of the base composition. With a base composition in which the metal aggregate is accurately graded or where a softer floor surface is desired a smaller proportion of filler may be employed. In some instances the ratio may be as low as one part by volume of filler to four parts by volume of the base composition, or on the other hand, the ratio of filler to base composition may be as high as two parts or so of filler by volume, to one part of base composition.

The filler may consist entirely of hydraulic cement or may be a mixture of cement and other fillers in which the proportion of cement may be as low as one part by volume of cement to three parts of other fillers. The amount of dispersing agent in the base composition is usually about .03 to .1% by weight of the finely divided filler including the hydraulic cement and should not exceed .1% of the cement in the surfacing composition.

For a filler for holes in a concrete surface, three parts of the base composition may be mixed with three parts of fine gravel and one part water.

In filling in a hole in a floor or other concrete surface, the dirt, dust and loose concrete are removed from the hole and any grease, oil or paint is removed by any good caustic cleaner, after which the hole is flushed out with liberal quantities of clean water. Pools of water are removed and the composition is sprinkled over the surface to be filled while the surface is still damp and is spread over and scrubbed into the entire surface to be filled by means of a stiff bristle brush. After a lapse of time, which varies according to drying conditions and may be a few hours or even a full day, the coat becomes partially dried and loses its luster finish but is still tacky. It is then in proper condition to receive the repair material for filling the holes, which comprises a stiff mixture of the asphalt and metal composition with cement aggregate and water, which is tamped firmly into the hole and allowed to set for from 24 to 36 hours.

After the holes have been filled as above described the entire surface may be refinished with the mix composed of the asphalt and metal composition and cement.

In resurfacing a concrete floor the surface of the concrete is thoroughly cleaned to remove dust and dirt, grease and paint, and thoroughly washed with clean water. A bonding coat is applied to the damp surface and spread by means of a broom or stiff brush and allowed to stand until it loses its luster finish as above explained.

After the bonding coat has been applied, a mix composed of the asphalt metal composition, a finely divided filler containing hydraulic cement and water is applied in a thin layer by means of a wood float or trowel and allowed to set for from 24 to 36 hours, the floor surface preferably being covered with paper or straw while setting to prevent too rapid drying of the surface.

The resultant surface is resilient and relatively noiseless by reason of the asphalt content. It is slip resistant and wear resistant by reason of the metal particles contained in the coating composition. The metal content of the surfacing material dissipates static condensation readily and lessens the danger of fires due to sparks struck up by the impact of metal objects striking the floor surface.

The surface is dense waterproof and of high compressive strength due to the small quantity of water in the mix made possible by the dispersing agent.

The composition herein disclosed is claimed in my copending application Serial No. 657,607, filed March 27, 1946.

It is to be understood that variations and modifications of the specific process and product herein shown and described for purposes of illustration may be made without departing from the spirit of the invention.

What I claim is:

1. The herein described method of resurfacing masonry and concrete structures which comprises applying thereto a bonding coat consisting essentially of a mixture of an asphalt in water emulsion containing from about 50% to about 70% by weight of asphalt and an aggregate of irregularly shaped iron particles size-graded so that the voids between the larger particles are substantially filled by smaller particles, the amount of said iron aggregate being from about one to about five times the amount of asphalt emulsion by weight, allowing the bonding coat to dry to a tacky condition, and when applying thereto a final surface coat consisting essentially of the mixture of said bonding coat having incorporated therein a substantial proportion of a finely divided non-metallic inorganic filler having a particle size of the order of the particles in commercial hydraulic cements and sufficient additional water to give the surface coat material a workable plastic consistency at normal temperature.

2. The herein described method of resurfacing masonry and concrete structures which comprises applying thereto a bonding coat consisting essentially of a mixture of an asphalt in water emulsion containing from about 50% to about 70% by weight of asphalt and an aggregate of irregularly shaped iron particles size-graded so that the voids between larger particles are substantially filled by smaller particles and containing an appreciable but minor proportion of particles which will be retained on an 8-mesh and an appreciable but minor proportion which will pass through a 100-mesh screen, the balance being of intermediate particle sizes, the amount of said iron aggregate being from about one to about five times the amount of asphalt emulsion by weight, allowing the bonding coat to dry to a tacky condition, and then applying thereto a final surface coat consisting essentially of the mixture of said bonding coat having incorporated therein a substantial proportion of a finely divided non-metallic inorganic filler having a particle size of the order of the particles in commercial hydraulic cements and sufficient additional water to give the surface coat material a workable plastic consistency at normal temperature.

3. The herein described method of resurfacing masonry and concrete structures which comprises applying thereto a bonding coat consisting essentially of a mixture of an asphalt in water emulsion containing from about 50% to about 70% by weight of asphalt and an aggregate of irregularly shaped iron particles size-graded so that the voids between the larger particles are substantially filled by smaller particles, the amount of said iron aggregate being from about two to about five times the amount of asphalt emulsion by weight, allowing the bonding coat to dry to a tacky condition, and then applying thereto a final surface coat consisting essentially of the mixture of said bonding coat having incorporated therein a substantial proportion of a finely divided non-metallic inorganic filler having a particle size of the order of the particles in commercial hydraulic cements and sufficient additional water to give the surface coat material a workable plastic consistency at normal temperature.

4. The herein described method of resurfacing masonry and concrete structures which comprises applying thereto a bonding coat consisting essentially of a mixture of an asphalt in water emulsion containing from about 50% to about 70% by weight of asphalt and an aggregate of irregularly shaped iron particles size-graded so that the voids between larger particles are substantially filled by smaller particles and containing an appreciable but minor proportion of particles which will be retained on an 8-mesh screen and an appreciable but minor proportion which will pass through a 100-mesh screen, the balance being of intermediate particle sizes, the amount of said iron aggregate being from about two to about five times the amount of asphalt emulsion by weight, allowing the bonding coat to dry to a tacky condition, and then applying thereto a final surface coat consisting essentially of the mixture of said bonding coat having incorporated therein a substantial proportion of a finely divided non-metallic inorganic filler having a particle size of the order of the particles in commercial hydraulic cements and sufficient additional water to give the surface coat material a workable plastic consistency at normal temperature.

5. The herein described method of resurfacing masonry and concrete structures which comprises applying thereto a bonding coat consisting essentially of a mixture of an asphalt in water emulsion containing from about 50% to about 70% by weight of asphalt and an aggregate of irregularly shaped iron particles size-graded so that the voids between the larger particles are substantially filled by smaller particles, the amount of said iron aggregate being from about one to about five times the amount of asphalt emulsion by weight, allowing the bonding coat to dry to a tacky condition, and then applying thereto a final surface coat consisting essentially of the mixture of said bonding coat having incorporated therein a finely divided non-metallic inorganic filler having a particle size of the order of the particles in commercial hydraulic cements and additional water, the amount of said non-metallic filler being from about ¼ to about twice the amount of asphalt emulsion plus iron aggregate by volume, and the amount of additional water being sufficient to give the surface coat material a workable plastic consistency at normal temperature.

6. The herein described method of resurfacing masonry and concrete structures which comprises applying thereto a bonding coat consisting essentially of a mixture of an asphalt in water emulsion containing from about 50% to about 70% by weight of asphalt and an aggregate of irregularly shaped iron particles size-graded so that the voids between the larger particles are substantially filled by smaller particles, the amount of said iron aggregate being from about one to about five times the amount of asphalt emulsion by weight, allowing the bonding coat to dry to a tacky condition, and then applying thereto a final surface coat consisting essentially of the mixture of said bonding coat having incorporated therein a hydraulic cement filler and additional water, the amount of said filler being from about 25% to about 100% of the amount of asphalt emulsion plus iron aggregate by volume, and the amount of additional water being sufficient to give the surface coat material a workable plastic consistency at normal temperature.

7. The herein described method of resurfacing existing masonry and concrete floor surfaces subjected to heavy traffic loads which comprises sprinkling upon and spreading over the existing surface in a thin substantially continuous layer a sticky bonding material consisting essentially of a mixture of an asphalt in water emulsion containing from about 50% to about 70% by weight of asphalt and an aggregate of irregularly shaped iron particles size-graded so that the voids between the larger particles are substantially filled by smaller particles, the amount of said iron aggregate being from about one to about five times the amount of asphalt emulsion by weight, allowing the bonding coat to dry to a tacky condition, and then applying thereto a final surface coat consisting essentially of the mixture of said bonding coat having incorporated therein a substantial proportion of a finely divided non-metallic inorganic filler having a particle size of the order of the particles in commercial hydraulic cements and sufficient additional water to give the surface coat material a workable plastic consistency at normal temperature.

8. The herein described method of resurfacing existing masonry and concrete floor surfaces subjected to heavy traffic loads which comprises sprinkling upon and spreading over the existing surface in a thin substantially continuous layer a sticky bonding material consisting essentially of a mixture of an asphalt in water emulsion containing from about 50% to 70% by weight of asphalt and an aggregate of irregularly shaped iron particles size-graded so that the voids between the larger particles are substantially filled by smaller particles, the amount of said iron aggregate being from about two to about five times the amount of asphalt emulsion by weight, allowing the bonding coat to dry to a tacky condition, and then applying thereto a final surface coat consisting essentially of the mixture of said bonding coat having incorporated therein a substantial proportion of a hydraulic cement filler and sufficient additional water to give the surface coat material a workable plastic consistency.

BOURDETTE R. WOOD.

REFERENCES CITED

The following references are of record in the file of this patent:

UNITED STATES PATENTS

| Number | Name | Date |
|---|---|---|
| 1,012,832 | Flesheim | Dec. 26, 1911 |
| 1,470,378 | Kleinlogel | Oct. 9, 1923 |
| 2,008,978 | Daimler | July 23, 1935 |
| 2,068,966 | Thurston | Jan. 26, 1937 |
| 2,221,499 | Torri | Nov. 12, 1940 |
| 2,239,688 | Peik | Apr. 29, 1941 |
| 2,307,696 | Blair-McGuffie | Jan. 5, 1943 |
| 2,370,386 | Anderson et al. | Feb. 27, 1945 |